(12) United States Patent
Ghosh et al.

(10) Patent No.: US 8,407,482 B2
(45) Date of Patent: Mar. 26, 2013

(54) USER SESSION DEPENDENT URL MASKING

(75) Inventors: Biswadip Ghosh, Thornton, CO (US); Santhpur N. Rao, Superior, CO (US)

(73) Assignee: Avaya Inc., Basking Ridge, NJ (US)

( * ) Notice: Subject to any disclaimer, the term of this patent is extended or adjusted under 35 U.S.C. 154(b) by 1567 days.

(21) Appl. No.: 11/395,439

(22) Filed: Mar. 31, 2006

(65) Prior Publication Data
US 2007/0245027 A1    Oct. 18, 2007

(51) Int. Cl.
*H04L 29/06* (2006.01)
(52) U.S. Cl. .................... 713/189; 726/2; 726/26
(58) Field of Classification Search .............. 713/189; 726/2, 26
See application file for complete search history.

(56) References Cited

U.S. PATENT DOCUMENTS

| | | | | |
|---|---|---|---|---|
| 5,870,468 A * | 2/1999 | Harrison | ...... | 713/165 |
| 6,304,893 B1 * | 10/2001 | Gish | ...... | 709/203 |
| 6,542,933 B1 * | 4/2003 | Durst et al. | ...... | 709/229 |
| 7,035,442 B2 * | 4/2006 | Ha et al. | ...... | 382/124 |
| 7,089,425 B2 * | 8/2006 | Chan | ...... | 713/189 |
| 7,127,609 B2 * | 10/2006 | Royer et al. | ...... | 713/162 |
| 7,260,224 B1 * | 8/2007 | Ingle et al. | ...... | 380/279 |
| 7,310,813 B2 * | 12/2007 | Lin et al. | ...... | 726/3 |
| 7,509,490 B1 * | 3/2009 | Hsu et al. | ...... | 713/162 |
| 2002/0083178 A1 * | 6/2002 | Brothers | ...... | 709/226 |
| 2002/0095605 A1 | 7/2002 | Royer et al. | | |
| 2002/0133697 A1 * | 9/2002 | Royer et al. | ...... | 713/150 |
| 2004/0122925 A1 * | 6/2004 | Offermann | ...... | 709/223 |
| 2004/0199762 A1 * | 10/2004 | Carlson et al. | ...... | 713/153 |
| 2006/0236106 A1 * | 10/2006 | Patel | ...... | 713/169 |

FOREIGN PATENT DOCUMENTS

WO    98/32066    7/1998

\* cited by examiner

*Primary Examiner* — Benjamin Lanier
(74) *Attorney, Agent, or Firm* — Sheridan Ross P.C.

(57) ABSTRACT

The present invention is directed toward a method, device, and system for enhancing web security by masking a URL embedded in at least some portion of web content. A session dependent URL is generated and masked on a server side prior to being distributed to a customer for viewing. The session dependent URL is only active during the session in which it was generated. After the session has ended information relating to the session, web content, and masking of the URL is purged from memory.

22 Claims, 8 Drawing Sheets

| Session 1 Masking Parameters | | |
|---|---|---|
| Static | Transient | Masking |
| User ID<br><br>Session ID | Request Time<br><br>Server Information<br><br>WEB Content Information | Server Free Disk Space<br><br>CPU Usage Information<br><br>Server ID Number<br><br>Request Time |

| Session 2 Masking Parameters | | |
|---|---|---|
| Static | Transient | Masking |
| User ID<br><br>Session ID | Request Time<br><br>Server Information<br><br>WEB Content Information | Number of Characters Next to URL<br><br>Number of High Priority Processes<br><br>Requestor's IP Address |

USER SESSION DEPENDENT URL MASKING

FIELD

The invention relates generally to web services and servers used to provide web service to clients and specifically to masking URLs in web content provided to clients.

BACKGROUND

An important factor, which has led to a rapid growth in people and businesses connecting to the Internet, is the wealth of information it contains and makes available to practically anyone who has a telephone connection and a personal computer. This strength, however, leads to problems when an information or service provider, which uses the Internet as its communications medium, wishes to control the information being accessed.

The information accessible from the Internet is stored on servers, which form part of the Internet infrastructure. The information is accessed by clients, which are controlled by users or customers and are typically connected to, but not part of, the Internet. Normally, the clients connect only to the Internet for a relatively short time using, for example, a dial-up modem connection across a telephone line or an Ethernet adaptor connected to an Ethernet cable.

While communications and information transfer between Internet clients and servers relies on the well-established TCP/IP protocols, higher-level, dedicated protocols are employed to access certain types of information specific to one of the many services available on the Internet. Different services support different formats of information and allow different types of operation on the information.

For example, a Gopher client allows retrieval and display of predominantly text-based information, an FTP (File Transfer Protocol) client supports the transfer between a server and a client of binary or ASCII files, and a World Wide Web (or simply a Web) client can retrieve and display mixed text and graphical information, as well as sounds, movies (usually encoded via MPEG), virtual 'worlds', and any other data type for which an appropriate 'viewer' ('helper') application or 'plug-in' is available.

The Web employs the HyperText Transfer Protocol or HTTP to support access by a Web browser of information on a Web server. Of course, when transmitted across the Internet, the HTTP information is wrapped in the TCP/IP protocol. The information retrieved by the Web browser is typically an HTML (HyperText Markup Language) file, which is interpreted by the browser and displayed appropriately on a display screen as a Web page of information.

The Web browser specifies the information it wishes to retrieve using a URL (Universal Resource Locator) of the form:

(http://Internet server name/server directory/file name)

Typically, "http" indicates that the URL points to a Web page of information. The Internet translates the Internet server name into a physical network location. The server directory is the location on the server of the file and the file name is that of the file in the directory, which contains or generates the required information.

Figure 1:
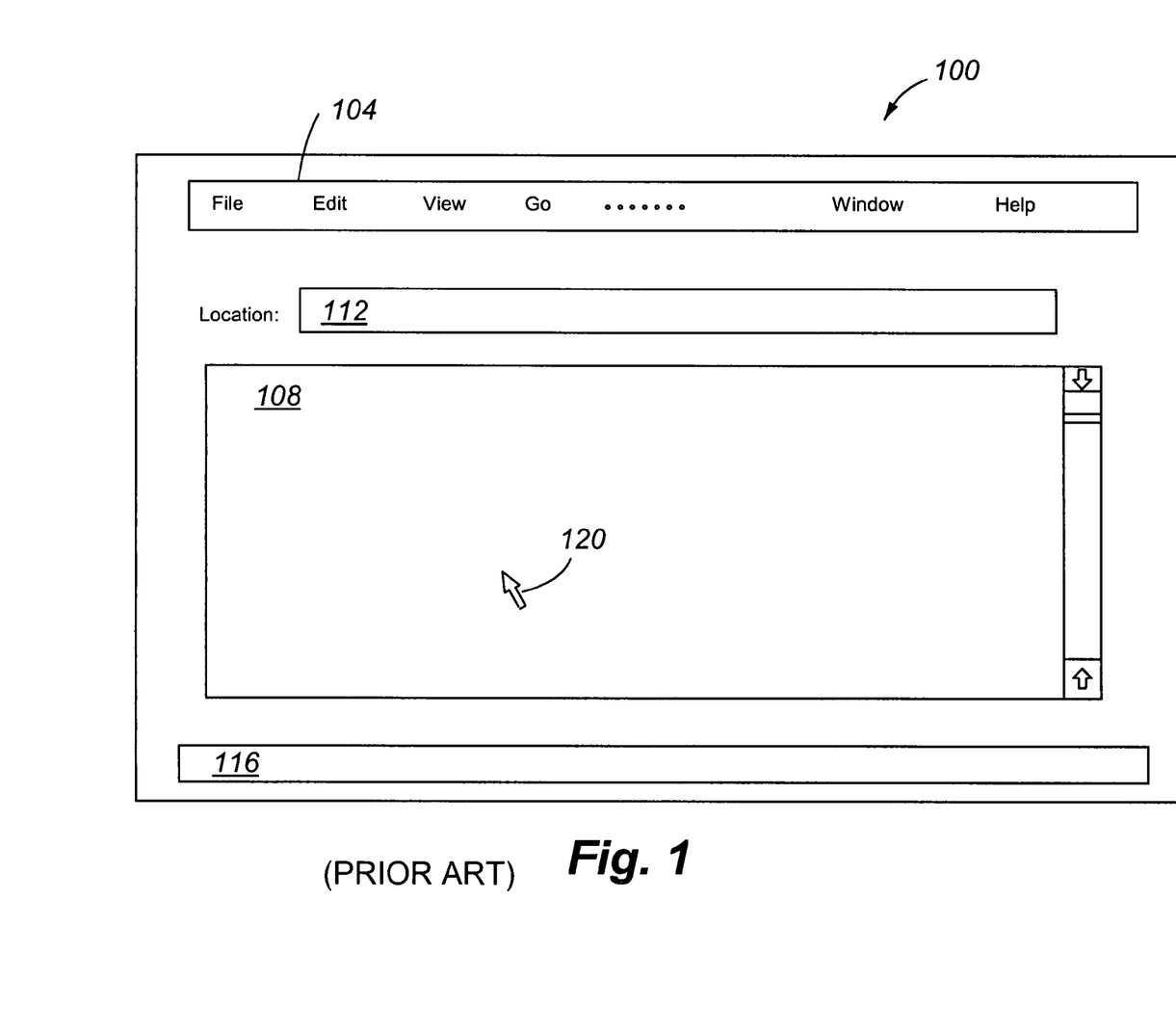
FIG. 1 depicts a general form of a typical graphical user interface display in accordance with at least some embodiments of the present invention.

FIG. 1 is a diagram illustrating the general form of a typical graphical user interface display 100 provided by a Web browser, for example the Netscape™ Navigator Web browser or Microsoft Explorer™ Web browser. The display 100 includes several main areas: an options area 104 providing the user-options for controlling and configuring the browser, a Web page display area 108 for displaying a Web page, a location box 112 for displaying the location, or URL, of the displayed Web page, and a status box 116 which displays information concerning the status of Web page retrieval.

Also illustrated on the screen is a pointer 120, the position of which can be tactily controlled by a user using a computer mouse, roller-ball or equivalent pointing device. The user interacts with the browser by positioning the pointer appropriately on the screen and selecting available options or functions provided by the browser or displayed on the Web page by, for example, 'clicking' a mouse button.

An HTML file comprises ASCII text, which includes embedded HTML tags. In general, the HTML tags are used to identify the nature and the structure of the Web page, and to identify HyperText links (hyperlinks), and their associated URLs.

Display capabilities of a Web browser typically determine the appearance of the HTML file on the screen in dependence upon the HTML tags. In general, a hyperlink provides a pointer to another file or Internet resource. Sometimes, a hyperlink can also point to a different location in a currently-displayed Web page. Within an HTML file, hyperlinks are identified by their syntax, for example:

<A HREF="(URL)">(anchor-text)</A>

Typically, the < . . . > structure identifies the HTML tags. The syntax typically includes a URL, which points to the other file, resource or location, and an anchor definition. In this case, the anchor is defined as a piece of text. In a Web page, typically a hyperlink is represented graphically on screen by the anchor. The anchor can be a piece of highlighted text or an image, for example a push-button or icon image. Where, for example, the anchor is non-textual, the underlying syntax usually also specifies a respective anchor image file location, which may be on the same or on a different server, as follows:

<A HREF="(URL)"> <IMG SRC="(URL)"> </A>

Where IMG SRC specifies the location of the image file for the anchor. The effect of a user selecting a hyperlink, by moving a pointer over the anchor and clicking, say, the mouse button, is normally that the Web browser attempts to retrieve a new Web page corresponding to the indicated URL.

However, sometimes a URL refers to a software process rather than to a Web page per se. In some browsers, for example Netscape Navigator™, when the pointer merely moves over a hyperlink anchor, the browser can be arranged to display the underlying URL in the status box of the display screen, irrespective of whether the user selects the hyperlink or not. Thus, a user can normally see the URL of any hyperlink in a Web page.

HTML files sometimes also include references to other files, for example, graphics files, which are retrieved by the browser and displayed as part of the Web page typically to enhance visual impact. Each reference comprises an appropriate HTML tag and a URL. In practice, the browser retrieves the requested Web page first and then retrieves other files referenced in this way by the Web page. Often, therefore, the textual portions of a Web page appear before the graphical portions.

A user is able to view the ASCII text source code of an HTML file using source code viewing facilities provided by some browsers. Thus, a user is able to view the URLs for any hyperlink or other imported file.

Generally, a user can retrieve a Web page using several methods which are supported by most browsers: by manually entering the URL into the location box 112, by selecting a Bookmark (the stored URL of a previously-accessed Web page), or by selecting a hyperlink in a displayed Web page 108. The first two methods potentially allow a user to access any Web page or other resource file at any time.

The third method requires the user to first access a Web page that incorporate a hyperlink to the required Web page or image file before that Web page or image file can be retrieved. In certain circumstances, it would be desirable to limit access by the third method only.

Since, however, a user can normally see any URL embedded in an HTML file and can access a Web page by entering the respective URL directly into a browser, under normal circumstances a service provider has little control over which Web pages are accessed and how they are accessed.

Many servers are arranged to address this problem by employing access tables, which include table entries controlling which users can access which pages.

An alternative measure, which is widely used, is to employ user identification and password protection to protect certain files on the server. Both measures are open to some degree to "spoofing" by unauthorized persons who have been known to masquerade as an authorized user by, for example, intercepting and cracking passwords for these protected files. A further disadvantage of both measures is the management overhead of keeping access tables or password files up-to-date, particularly where large numbers of users and/or pages are involved, or where the authorized user population changes regularly. Also, even if Web page access is controlled using access tables or password protection, a service provider normally has no control over the order in which an authorized user can access the Web pages once the URLs are known.

There have been some attempts to address these issues. For example, in PCT Patent Application No. 98/32066 to McGee, the contents of which are herein incorporated by this reference in their entirety, an Internet server employs a session manager that intercepts all incoming requests from clients for Web pages. Each request incorporates a token that is compared by the session manager with tokens, which are stored in a session database. Tokens in the database have a corresponding real URL. When a token in the database is found that matches the received token, the real URL is used to retrieve the Web page(s) associated with the URL. One drawback to using tokens, each of which has a corresponding real URL, is that the token may be stolen or used by an unauthorized party to access contents of the Web page associated with the token. The contents of the Web page are potentially compromised in the event that the token is compromised. This means that Web pages with sensitive data may be subject to unauthorized access without the Web server ever knowing that unauthorized access has occurred.

SUMMARY

Embodiments of the present invention are directed generally to the use of a URL masking device, system, and method. A masked URL is used to enhance web security associated with applications and other web content that can be accessed through use of a URL.

In one embodiment, the present invention is directed to a method. The method includes the steps of:

(a) receiving Web content comprising a first Uniform Resource Locator (URL) in a first Web session;

(b) determining a first set of parameters comprising one or more parameters which will be used to mask the first URL, the first set of parameters corresponding to the first session and being substantially unique to the first session;

(c) masking the first URL using the first set of parameters thereby creating a first masked URL;

(d) replacing the first URL with the first masked URL in the Web content, thus resulting in an altered Web content comprising the first masked URL; and (e) distributing the altered Web content generally over an untrusted network to at least one client.

As used herein a "session" corresponds to a predetermined amount of time or a period of time between client requests. Typically, a session is defined as the period of time when a client is connected with a particular server. The connection may be freely given, or may require some sort of password verification to initiate a session. In the event that the server is a Web server, then the session is referred to as a web session. However, in accordance with at least some embodiments of the present invention, a number of sessions may occur during the same connection between a client and a server. For example, a first session may end when a user begins to view new Web content from the same server and/or during the same log in. After the first session ends a second different session begins where a particular URL may be masked in a different way than it previously was.

A particular URL may occur several times in a given Web content. Each occurrence of the URL may be masked in a different manner than the other versions of the same URL. This will provide a higher level of security to the URL and its associated Web content.

As used herein "Web content" may be any type of electronic media that is viewable via a communication device like a computer, laptop, PDA, Blackberry™, cell phone, or the like. Examples of Web content include, but are not limited to, Web pages, HTML files, pdf documents, emails, videos, JPEGS, gifs and the like.

Also, as can be appreciated by one of skill in the art, embodiments of the present invention may be utilized on any reference character, image, or string that can be used to retrieve Web content. For purposes of illustration, the term URL is generally used herein to describe any electronically viewable and selectable reference to Web content.

A URL is generally masked to preserve some amount of security associated with its associated Web content and/or to deter fraudulent use of the URL. An unmasked URL allows any user to access relatively easily Web content that is referenced by the URL. On the other hand, a masked URL cannot be used to view Web content as easily. In accordance with at least some embodiments of the present invention, if an authorized client transmits a masked URL to a server requesting the associated Web content, the server first determines if an authorized client sent the URL, then the server determines if the URL is coming from a valid session. Thereafter, the server will unmask the URL and attempt to retrieve the associated Web content. If the URL has been altered in any way the server may not be able to properly unmask the URL, and will most likely not be able to retrieve the requested Web content.

These and other advantages will be apparent from the disclosure of the invention(s) contained herein. The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

The invention will be illustrated below in conjunction with an exemplary communication system. Although well suited for use with, e.g., a system utilizing a web server, the invention is not limited to use with any particular type of communication system server or configuration of such a server. Those skilled in the art will recognize that the disclosed techniques may be used in any communication application in which it is desirable to identify appearance differences in a customer that have occurred between times that the customer has initiated a contact.

The following description concentrates on the Internet Web service for the purpose of explanation only. The concepts described, however, are more broadly applicable to other Internet and intranet services and to other information services available from different communications networks.

Figure 2:
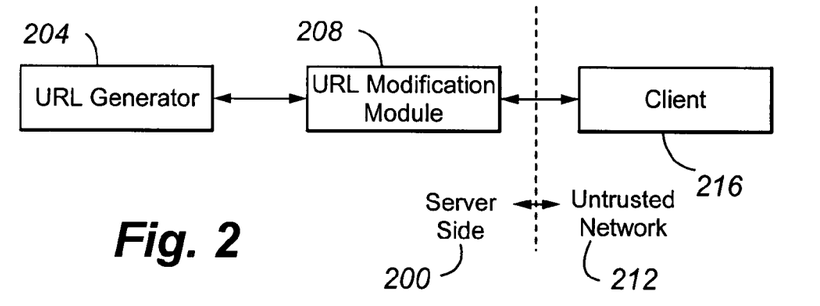
FIG. 2 depicts a block diagram depicting information flow in accordance with at least some embodiments of the present invention.

Referring to FIG. 2, the logical flow of Web content including a URL will be described in accordance with at least some embodiments of the present invention. In the depicted embodiment, URLs and Web content (e.g., Web pages, HTML documents, emails, IP phone calls, Video calls, and other applications) are handled on a server side 200. Specifically, when Web content is requested a URL will be at least shown in the location box 112 when presented to a client. Additional URLs may be located at various locations within the display area 108. These URLs are generally retrieved from a database containing URLs and associated Web sites by a URL generator 204 (which is conventional). The Web content and the URL is forwarded to the URL modification module 208. Here the URL is masked prior to being transmitted across an untrusted network 212 to a potentially untrusted person. Generally, the Web content and its associated masked URL(s) are targeted to a client 216 who happens to be connected to an untrusted network 212.

Figure 3:
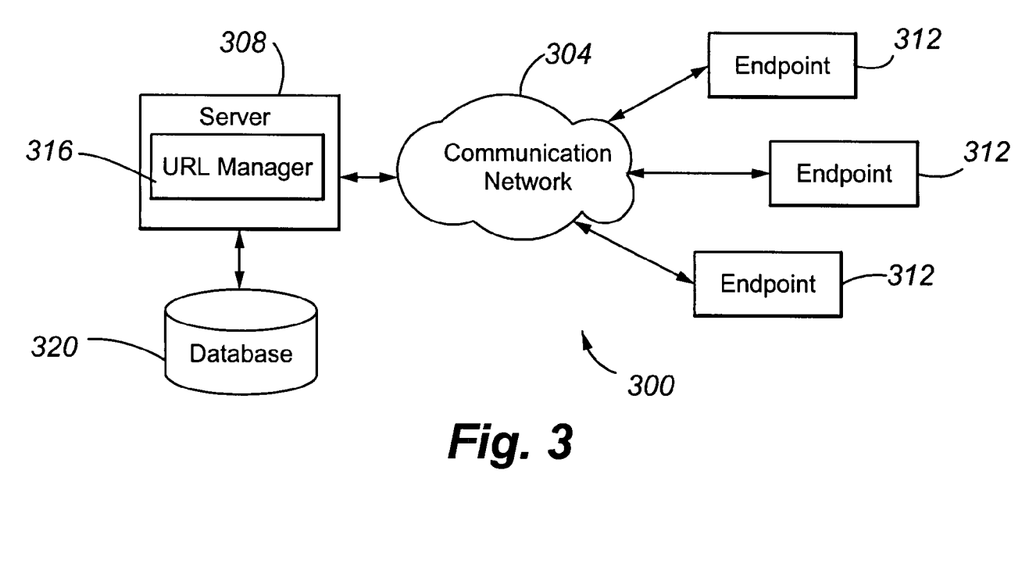
FIG. 3 depicts a block diagram of a communication system in accordance with at least some embodiments of the present invention.

Referring to FIG. 3, an exemplary communication system 300 will be described in accordance with at least some embodiments of the present invention. The communication system 300 comprises a communication network 304 providing a connection between a server 308 and a plurality of endpoints 312. The server 308 is typically embodied as a Web server and is in communication with a database 320.

The communication network 304 may be in the form of a LAN (Local Area Network) or a WAN (Wide Area Network) like the Internet. Generally, the communication network 304 is a packet-switched network operable to transmit information sent from one party for presentation to another.

The endpoints 312 may be any suitable apparatus used to view Web content over the communication network 304. Examples of endpoints 312 include, but are not limited to, Personal Computers, laptops, cellular phones, Blackberries™, PDAs (Personal Digital Assistants), IP enabled telephones, Internet enhanced televisions, and the like. As will be understood, such endpoints typically access Web content using a Web browser or the like.

As can be appreciated by one of skill in the art, the server 308 may be any server that receives requests, whether direct or indirect from a remote client via the communication network, and executes instructions of that request via a processor implementing executable instructions stored in a memory of the server 308 and/or the database 320. The requests can be in the form various application layer protocols including, for example, http SOAP (Simple Object Access Protocol), Java RMI (Remote Method Invocation), DNS (Domain Name Server), TLS/SSL (Transport Layer Security/Secure Sockets Layer), TFTP (Trivial File Transfer Protocol), FTP (File Transfer Protocol), IMAP (Internet Message Access Protocol), IRC (Internet Relay Chat), NNTP (Network News Transfer Protocol), POP3 (Post Office Protocol version 3), SIP (Session Initiation Protocol), SMTP (Simple Mail Transfer Protocol), SNMP (Simple Network Management Protocol), SSH (Secure Shell), TELNET, BitTorrent, RTP (Real-time Transfer Protocol), SCTP (Stream Control Transmission Protocol), or various transport layer protocols including, for example, TCP, UDP (User Datagram Protocol), and the like.

The server 316 further comprises a URL manager 316. The URL manager 316 generally comprises the URL generator 204 and the URL modification module 208. The URL manager 316 acts as a buffer between the server and the communication network 304. In other words, the URL manager 316 analyzes and edits incoming and outgoing Web content and any URL associated with the subject Web content. A URL may be embedded somewhere within the middle of a Web page, and the URL manager 316 is operable to locate the embedded URL and mask/unmask the URL depending upon the nature of the request.

In the sending mode, the URL manager 316 analyzes and edits Web content that is intended for delivery to a client 216 associated with at least one of the endpoints 312. The URL manager 316 scans the Web content searching for URLs and when any URL is located, the URL manager 316 is operable to mask the URL within the Web content.

The URL manager 316 employs various parameters to mask/unmask a given URL. Examples of such parameters used to mask/unmask a particular URL include, but are not limited to, time-based information (e.g., time that a client requested a particular Web content, time that content was provided to the client, and/or any time associated with a particular action or event), system transient information (e.g., server identification number, number of processes currently being employed, free disk space in the server, file being accessed by the server, number of high priority processes, number of files open on a system connected to the server, CPU's usage information, user name/identifier, session identifier, etc.), and other information including a randomly or pseudo-randomly generated integer. The URL is masked according to a selected number of parameters and these parameters are essentially the "key" used to mask the URL. A URL is preferably masked in a different manner every time an action associated with the URL is requested. In one configuration, this is accomplished using a known algorithm, such as AES, DES, Blowfish, RSA, Diffie-Hellman, ElGamal, RC4, RC5, IDEA, TDES, or hash functions, with all or part of the URL to be masked and one or more non-constant (i.e., transient) or time-changing variables, such as those noted above as inputs. When Web content is initially displayed to a client 216, a first URL may be masked using a first subset of parameters. The next time that particular URL is requested, it is masked in a different way possibly using a second subset of parameters. For example, the first time a URL, say "www.Avaya.com", may be masked utilizing free disk space in the server and the number of high priority processes currently being performed by the server. The second time the same URL shows up it may be masked utilizing the first four words that appear in from of the URL on the Web content and the number of files being accessed by the server. The parameters may be chosen based on the time-stamp information. So, for any particular second, minute, hour, day, etc. that a request is processed a different subset of parameters may be chosen to mask a given URL. This helps ensure that an authorized user that initiated a given session can only use the distributed URL.

A masked URL is generally pseudo-randomly masked prior to being distributed to a client 216. The parameters used to mask the URL are retained in an erasable memory that is part of the URL manager 316. This way, when the client 216 selects a URL, the masking parameters can be referenced and the URL manager 316 unmasks the masked URL. The unmasked URL is sent to other functionality within the server 208 such that Web content relating to the selected URL is retrieved and subsequently sent to the client 216, after URL(s) within the new Web content have been masked of course.

Figure 4:
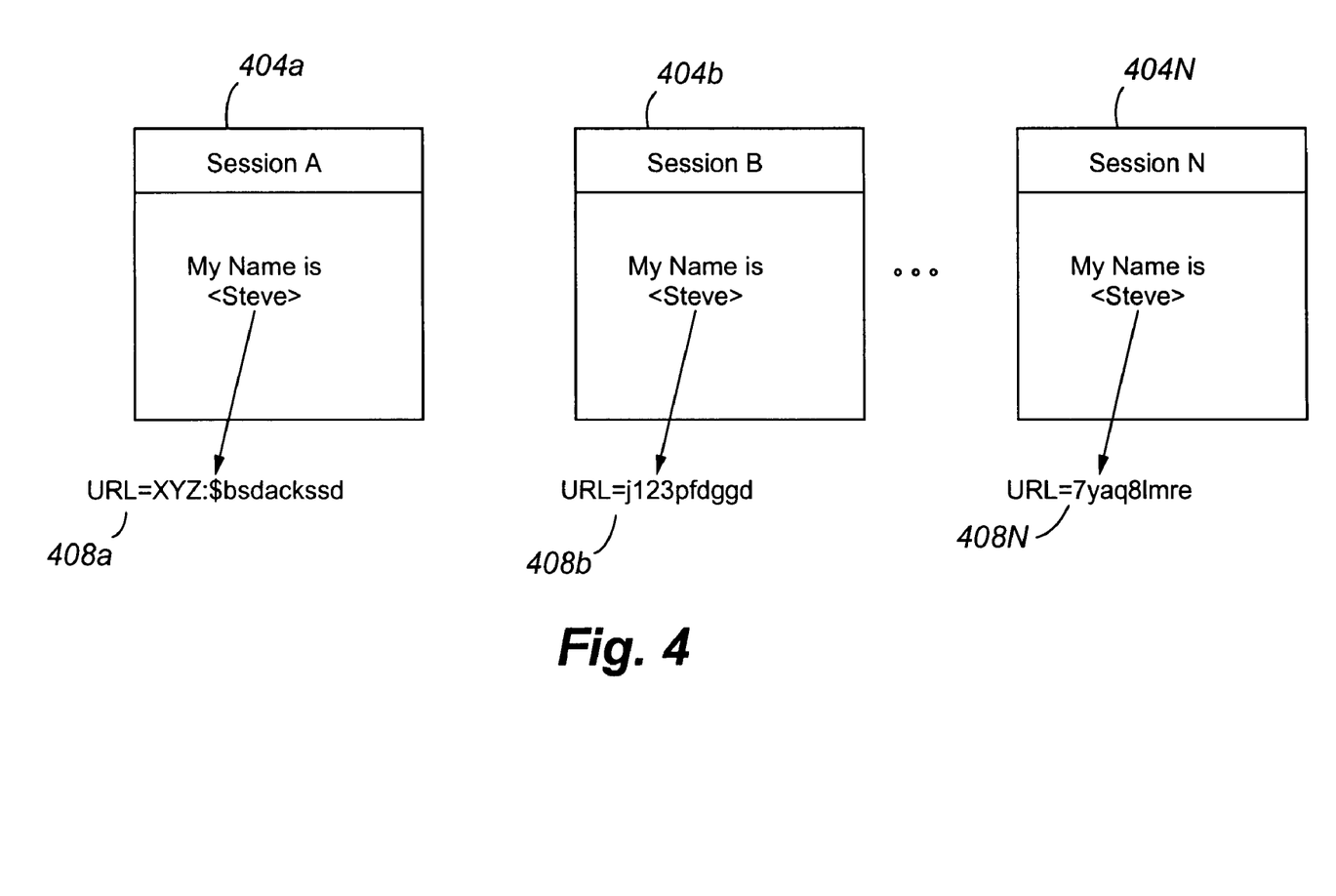
FIG. 4 depicts various user sessions and displays during those sessions in accordance with at least some embodiments of the present invention.

Referring now to FIG. 4, variances of a URL between sessions will be described in further detail in accordance with at least some embodiments of the present invention. A particular URL 408a in a first session 404a may be masked using a first set of parameters as noted above. Assume for example that the subject Web content being displayed to and navigated by a particular client 216 is a secure business site showing quarterly financial numbers for a certain company. In the past, URLs appearing in either the location box 112 and/or the display area 108 were not necessarily masked. This allowed the navigating, supposedly permitted client 216, to freely view the URL. The client 216 would then be able to possibly change the URL, i.e. modify a portion of the URL contents, and enter the modified URL into the location box 112 in an attempt access other Web content to which he or she may or may not be permitted. Additionally, the client 216 would have been able to send the URL to a "friend" either via email or some other medium. The friend would then be able to access the same Web content that the permitted client 216 was allowed to view, whether the friend is permitted access to such Web content or not.

In accordance with at least some embodiments of the present invention, a masked URL substantially precludes a client 216 from altering a URL in order to gain access to other Web content to which he/she is not permitted access. Additionally, utilizing a masked URL substantially precludes a client 216 from forwarding the URL on to a friend in an attempt to allow the friend access to the same Web content if such access is not permitted. One way a masked URL precludes such activity is by enabling the URL with a deactivation element. The deactivation element may be implemented as a timing-out mechanism that changes at least a portion of the URL after a predetermined amount of time. After at least a portion of the masked URL has been changed due to the activation of the timing-out mechanism, the URL manager 316 will not be able to accurately unmask the URL and therefore access to Web content associated with the URL will be denied. Alternatively, each masked URL may have selected time-to-live, after which it is removed from the map of URLs and their corresponding masks.

Additionally, the URL may be enabled with an activation sensitive element (e.g., a counter) that counts or otherwise has a value that depends on the number of actions performed by a client 216 during his/her navigation of the Web content associated with a particular URL. For example, every time the client performs a mouse click, the masked URL will change based on some parameter, preferably a time-based parameter (such as those above) or some other parameter that the server is operable to monitor. The monitoring operation may be done by an applet downloaded by the server to the client. The monitored operation results may be returned to the server when the monitored client forwards messages (e.g., content requests to the server.) The session may change every time the client 216 performs any predefined action. Thus, in the second session 404b, after the first masked URL 408a changes form to a second masked URL 408b, the URL manager 316 registers a change in sessions and updates the parameters used to unmask the second URL 408b. Thus, authorized actions performed by an authorized client 216 will change the masked URL but since the URL manager 216 is aware of the changes to the masked URL, the URL manager 216 can update parameters used to unmask the URL. The result of the URL manager 216 monitoring actions and updating URL unmasking parameters is Web content associated with the second masked URL 408b can still be accessed. However, if one of the actions performed by the client 216 includes an action that is not allowable (e.g., a "copy" and/or "paste" function was executed), then the URL manager 216 may not update the unmasking parameters rendering the second masked URL 408b useless. As can be seen in FIG. 4, the URL may be masked the up to N times resulting in 408N, if N events occur, where N is typically greater than or equal to one. In the event that each of the actions causing the masked URL to change was an allowable action, then the server 308 may still recover Web content associated with the masked URL 408N in the Nth session 404N.

A URL may be masked in a number of different ways between different sessions and based upon different actions. Part of the original masking operation of the URL may include enabling the URL with an activation sensitive element as noted above. The operation of the activation sensitive element is enabled by the URL manager and therefore known by the URL manager. After a particular action is performed, the masked URL may be masked according to a new set of parameters (e.g., subject matter surrounding the original URL in the Web content). For example, if the original URL was masked based upon the first four words immediately preceding the URL in the Web content resulting in a first masked URL, then after a first action, the first masked URL may be further masked according to the first four words immediately succeeding the URL in the Web content. The result will be a second URL that is twice masked. If the first action was an allowable action, then the URL manager 316 updates the masking parameters and knows that if the second URL is received it will need to be unmasked using the first four words immediately succeeding the URL then the resulting URL will need to be further unmasked using the first four words immediately preceding the URL. After the URL has been successfully unmasked the Web content associated with the twice-masked URL can be transmitted to the client 216.

Another way to provide security to the masked URL is to include known parameters of the client's endpoint 312 in the masking operation. For example, the IP address of the requesting authorized endpoint 312 and an identification number of the subject endpoint 312 may be used. The URL manager 316 may require this identification information to be sent along with a URL request prior to providing the endpoint 312 Web contents associated with the URL.

Figure 5:
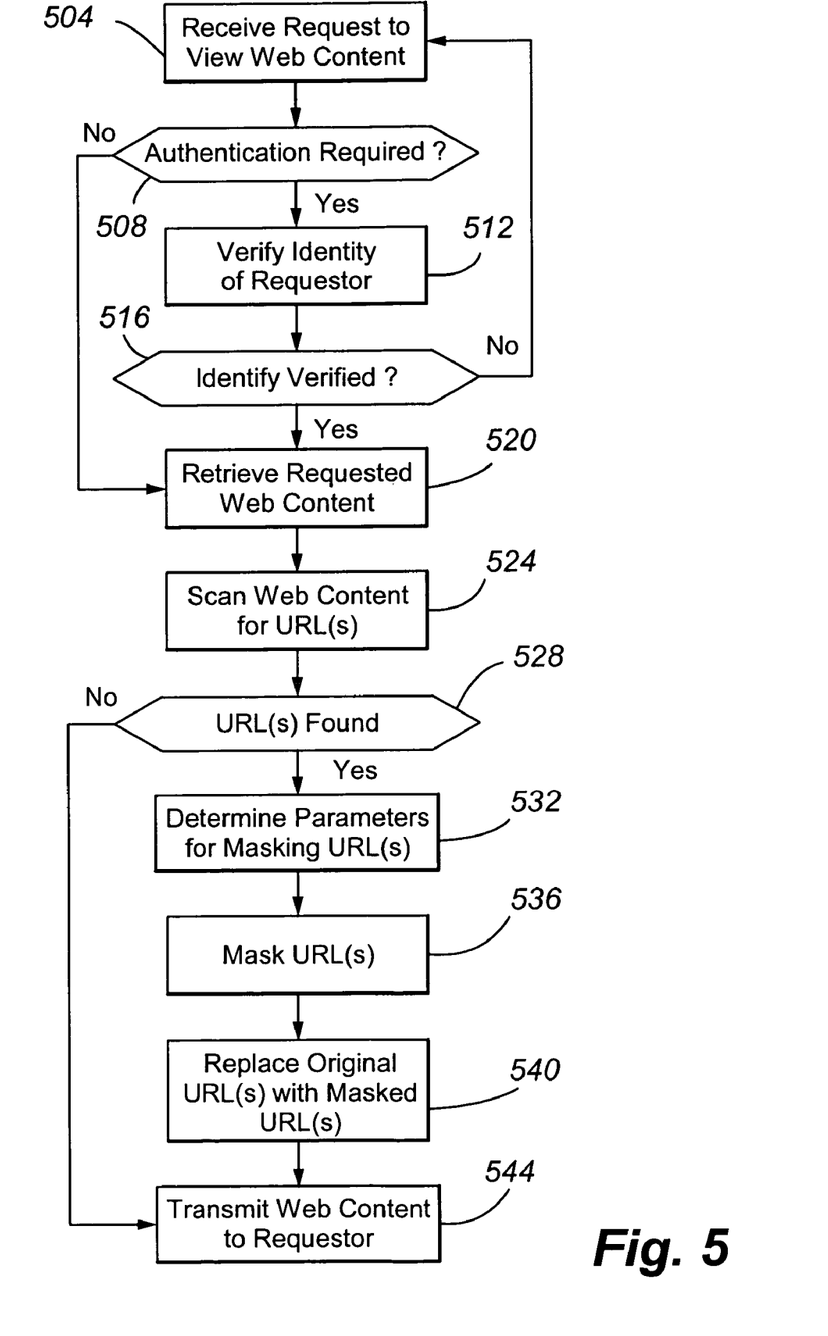
FIG. 5 depicts a method of generating web content for display to a client in accordance with at least some embodiments of the present invention.

Referring now to FIG. 5, a method of preparing Web content for transmission to a client will be described in accordance with at least some embodiments of the present invention. The method is initiated upon receipt of a request for Web content by the server 308 (step 504). Thereafter, the server 308 determines whether user authentication is required to view the requested Web content (step 508). In other words, the server 308 determines if the requested Web content is password protected or the like. In the event that access to the requested Web content is restricted then the server 308 will initiate some sort of identity verification procedure (step 512). This step may include requiring the requesting client ("requester") to input a password or provide some other sort of verification of his/her identity. In step 516, it is determined whether the identity of the requestor has been verified. If the identity of the requestor was not verified in step 516, then the method returns to step 504 and waits for another request for the web content. Alternatively, the requester may be presented with another chance to verify his/her identity to the server 308. If the requestor has been able to verify his/her identity to the server 308 or no authentication was required to view the requested Web content, then the requested Web content is retrieved typically from a Web content database which may be a part of database 320 or may be in the form of memory within the server 308.

The URL manager 316 typically scans the retrieved Web content for URLs and other references to different Web content (step 524). The Web content may be scanned for typical indicators of references to other Web content including instances of "www." or "@yahoo" or ".com/.org/.gov" and so on. In step 528 it is determined if any URL(s) were found during the scanning step. In the event that one or more of these common indicators are found, hence some URL(s) may exist in the Web content, then the method continues to step 532 where masking parameters are determined.

During a first session, a first set of masking parameters may be used that are made up of at least one chosen parameter. For example, assume that there exist five different eligible parameters (e.g., first twelve characters before the URL, first twelve characters after the URL, free disk space in the server, number of files being accessed by the server, and server identification number) that could be used to mask a given URL. Based on the time that the request for the Web content was received, i.e. the request was received at the third second of a given minute, the first and third parameters may be chosen. During a second session, a second set of masking parameters may be selected from the same five eligible parameters to mask a given URL. Again the parameters that are selected could be based upon the time the request for Web content was received. However, the time associated with the second session will most likely differ from the first time. For example, the second session may have been requested at the fortieth second of a given minute, this may result in the second, third, and fifth parameters being used to mask the URL. Consequently, a single URL may be masked differently between sessions. Furthermore, in the event that the same URL appears multiple times in Web content, each instance of the URL may be masked differently, especially if one or more of the parameters used to mask the URL depend on content surrounding the subject URL. This way a common URL will not be as easily discovered. As can be appreciated by one of skill in the art, the more eligible parameters that are made available to the URL manager 316 to mask URLs, the more secure the masked URL and the contents referenced by the URL will be.

Once the masking parameters have been determined, the URL manager 316 masks each URL using the determined masking parameters (step 536). Subsequently, the URL manager 316 will replace the original URL(s) with the masked version of the URL(s) in the Web content (step 540). Of course, it may not be necessary to mask each and every URL that appears in Web content. Rather, only selected URLs will need to be masked and replaced with a masked URL. Some URLs may be referencing highly sensitive material that requires a higher level of security than some other URL. In this case, the URL manager 316 may mask the URL referencing the sensitive material, whereas the URL referencing less sensitive material may not be masked. After the URL(s) in the Web content have been sufficiently masked and replaced, then the altered Web content is transmitted to the requester for display on his/her endpoint 312 (step 544).

As can be appreciated, URLs may appear in both the location box 112 and/or the display area 108. Therefore the URL manager 316 will scan both of these locations and appropriately mask any URLs that show up in the Web content. Typically, the URL in the location box 112 will be masked so that it cannot be deceitfully used by the client 216 or intercepted and used by an unauthorized third party. Likewise, the URL(s) that appear in the display area 108 or any other portion of the Web content for that matter can be masked and replaced with a masked URL if the URL requires such treatment.

Figure 6:
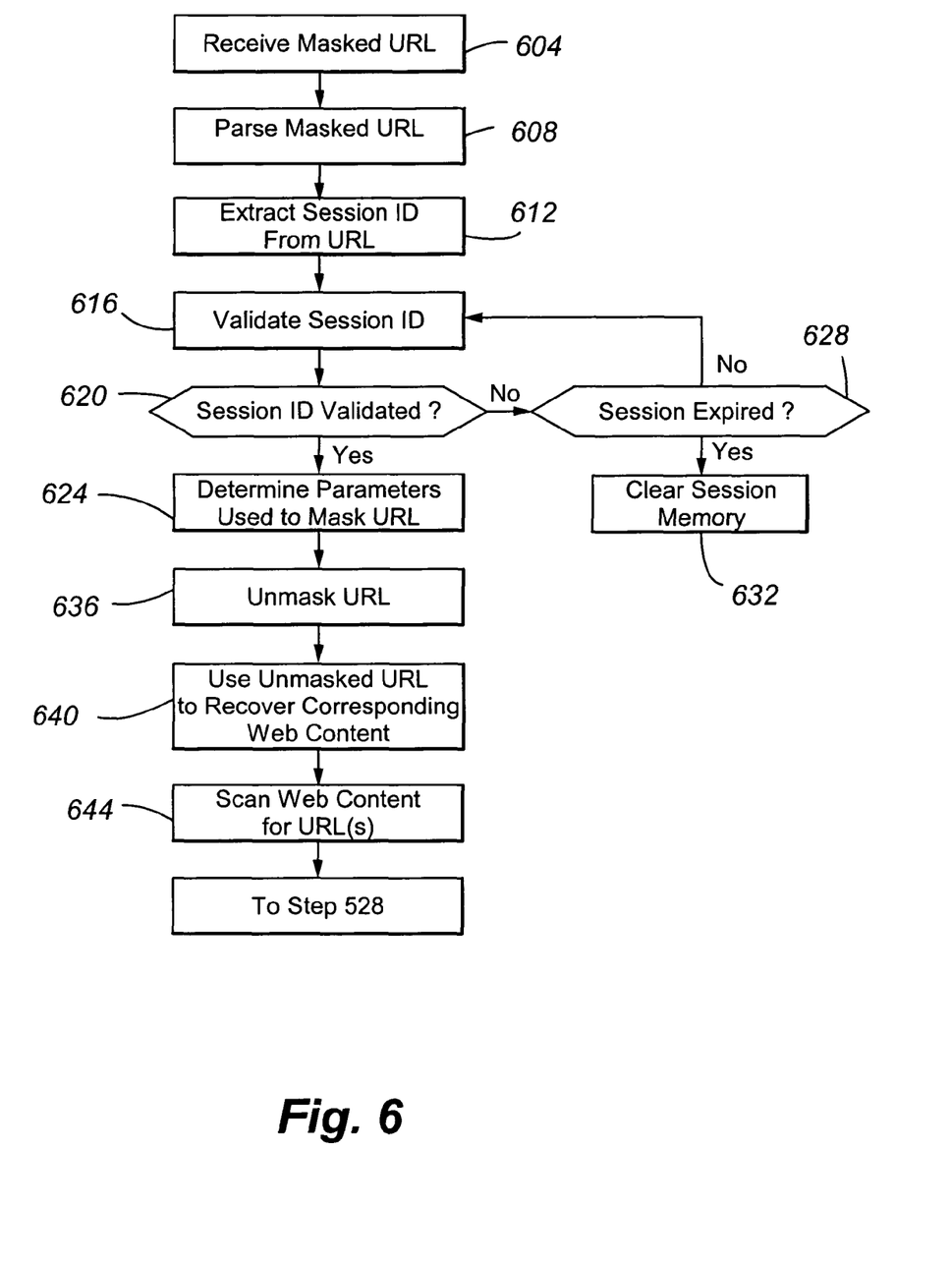
FIG. 6 depicts a method of retrieving web content based on a received masked URL in accordance with at least some embodiments of the present invention.

Referring now to FIG. 6, a method of handling a masked URL will be described in accordance with at least some embodiments of the present invention. The method begins when a masked URL is received by the server 308 (step 604). In step 608, the received URL is parsed by the URL manager 316. Typically in the parsing step, the URL manager 316 separates the session identification information from the masked URL from the rest of the URL. When a URL is masked it is generally given a session identification number as a part of the masking operation. This session identification number is extracted by the URL manager 316 (step 612). The session identification number is used to verify the validity of the URL along with the validity of the requestor of the URL. The session identification number will usually change when it is passed from one client to another client. If the URL was not allowed to be exchanged between clients the session identification number will change, thus when the URL manager 316 receives the URL with a different session identification number, the URL manager 316 can verify that the URL has been exchanged.

In step 620 it is determined if the session identification number is valid. If the session identification number is not valid, i.e. the URL has been exchanged, time has expired in the session, or some other unauthorized action has been performed on the URL, then the method continues to step 628 to determine if the session expired. If it is determined that the session has expired then the static information relating to the session along with any cookies in the server 308 are erased in step 632. If the session has not yet expired, then the client may be given another chance to request Web content associated with the URL and the method returns to step 616 to recheck the session identification number of the URL. If the session identification number was verified in step 620, then the method continues to step 624 where additional masking parameters are determined. The masking parameters are typically unique to each URL and each session. Therefore, a memory of the masking parameters for a single session is maintained in the URL manager 316. The URL manager 316 maintains masking parameters information in a readily erasable memory rather then maintaining the information in a database 320.

Once the URL manager 316 determines the parameters that were used to masked the received URL, then the URL manager is operable to unmask the URL using the parameters in an operation that is the inverse of the operation used to mask the URL (step 636). The server 308 uses the unmasked URL to recover the corresponding Web content (step 640). The URL manager 316 then scans the requested Web content to determine if any URLs are in the requested Web content (step 644). Thereafter, the method proceeds back to step 528 where it is determined if any URLs were found and the method continues as described in reference to FIG. 5.

Figure 7:
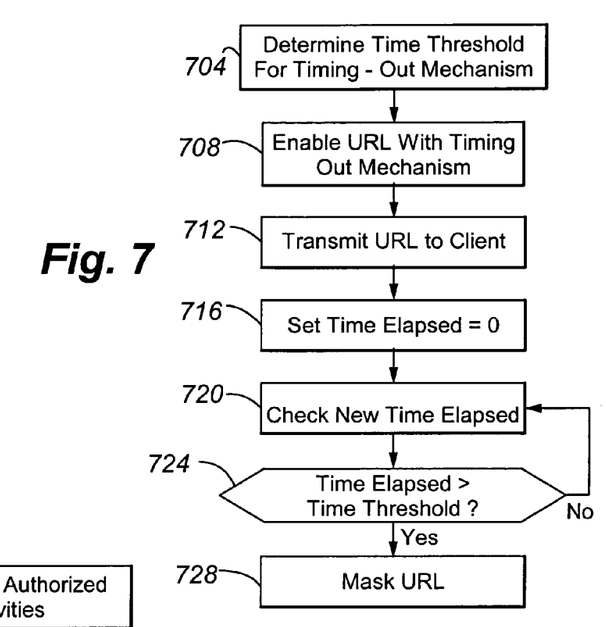
FIG. 7 depicts a method of enabling a URL with a timing-out mechanism in accordance with at least some embodiments of the present invention.

Referring now to FIG. 7 a method of enabling a URL to expire will be described in accordance with at least some embodiments of the present invention. Initially, in step 704, a time threshold for a timing-out mechanism is determined. The time threshold corresponds to the amount of time a given session is allowed to persist without any actions before the session is terminated. The time threshold may be a small as a number of seconds or may be as large as a number of days depending upon the application and session particulars.

Once the time threshold for the timing-out mechanism has been determined, a URL is enabled with the timing-out mechanism (step 708). A masked URL is typically enabled with the timing-out mechanism, although an unmasked URL may be enabled with the timing-out mechanism as well before it is provided to a client. The URL with the timing-out mechanism is then transmitted to the client typically as a part of Web content, either in the location box 112 and/or the display area 108.

When the URL has been transmitted to the client 216 an elapsed time variable is initialized and set equal to zero (step 716). The server 308 then monitors the client 216 and as the client 216 is monitored, the server 308 determines how much time has elapsed since the URL was initially sent to the client 216 (step 720). The amount of time that has elapsed for a particular session may correspond to how long a single Web content has been viewed or may correspond to the amount of time between client actions (e.g., mouse clicks, key strokes, commands, and the like). In step 724, it is determined if the elapsed time for the given session has exceeded the time threshold. If the time threshold has been exceeded by the elapsed time then the session is considered terminated and the URL is masked such that the URL manager 316 cannot properly unmask the URL. In an alternative embodiment, the URL may not necessarily be masked when the time threshold expires. Rather, the masking parameters that were originally used by the URL manager 316 to mask the originally transmitted URL may be altered or cleared from the URL manager's 316 memory.

Figure 8:
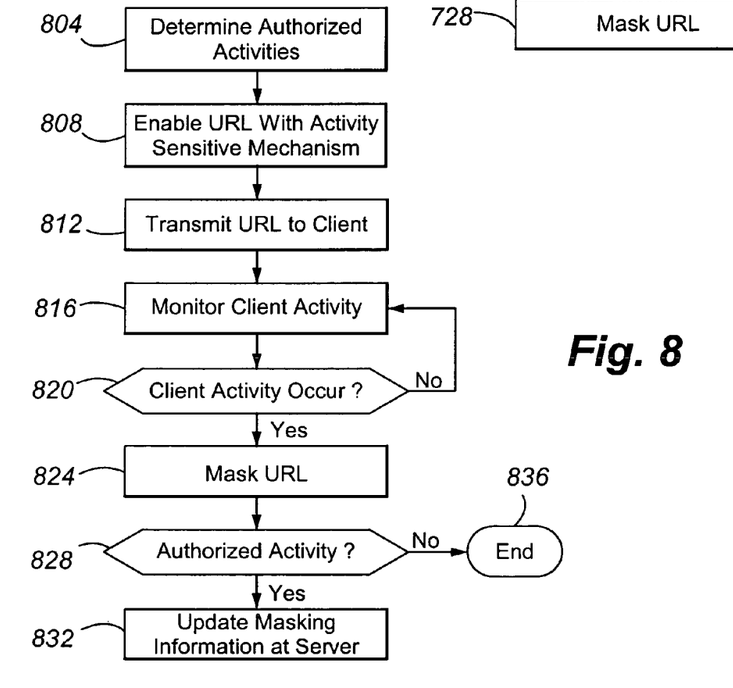
FIG. 8 depicts a method of enabling a URL with an activity sensitive mechanism in accordance with at least some embodiments of the present invention.

Referring now to FIG. 8, a method of enabling a URL to expire upon the occurrence of an unauthorized activity will be described in accordance with at least some embodiments of the present invention. Initially, in step 804, the URL manager 316 determines authorized activities that may be performed either during a session or on a particular URL. Examples of authorized activities include, but are not limited to, selection of a URL, certain key strokes, navigation of a particular Web content or a number of Web contents, and the like. Excluded from the list of authorized activities are generally any unauthorized activities. Examples of unauthorized activities may include, but are not limited to, executing a "copy" and/or "paste" function, highlighting a URL, navigating to restricted Web content, and so on. As can be appreciated, a list of unauthorized activities may be determined and any activity that does not appear in the list of unauthorized activities may be considered an authorized activity. This may provide an easier way to implement generating a list of authorized activities, especially if the list of unauthorized activities is relatively small compared to the number of authorized activities.

Once authorized activities have been determined then a URL is enabled with an activity sensitive mechanism (step 808). The URL that is enabled with the activity sensitive mechanism may be a masked URL or may be the original version of a URL depending upon the sensitivity of the URL and its associated Web content. The activity sensitive mechanism is operable to change how the URL is masked. Generally, the activity sensitive mechanism is a list of predetermined masking operations, where each masking operation changes how the URL is masked and may use different masking parameters. The URL manager 316 maintains a list of the same predetermined masking operations. Therefore, if the activity sensitive mechanism is engaged and the URL masks itself, the URL manager 316 will be able to know how the URL was masked and may subsequently unmask the URL if requested to do so. The activity sensitive enabled URL is then transmitted to a client 216 (step 812). Thereafter, the URL manager 316 monitors the client 216 and his/her performed actions (step 816).

In step 820, it is determined if a client activity has occurred. If no client activity has occurred, then the method returns to step 816 and the URL manager 316 continues to monitor the client 216. However, if an activity has occurred then the URL changes how it is masked, typically according to some predetermined parameters in a predetermined fashion (step 824). Thereafter, the URL manager 316 determines if the activity was an authorized activity (step 828). If the action performed was not an authorized activity, then the method ends in step 836. This means that the URL has changed the way it is masked but the URL manager 316 has not updated its records of the masking parameters for the newly masked URL. Thus, if that particular URL is requested at a later time, the URL manager 316 will not be able to properly unmask the URL rendering the URL useless and the Web content associated with the URL inaccessible. If the action performed did correspond to an authorized activity, then the URL manager 316 will update its masking records to reflect the new masking of the URL (step 832). This way if a client 216 requests Web content associated with the newly masked URL, the URL manager 316 can unmask the URL and retrieve the associated Web content.

Figure 9A:
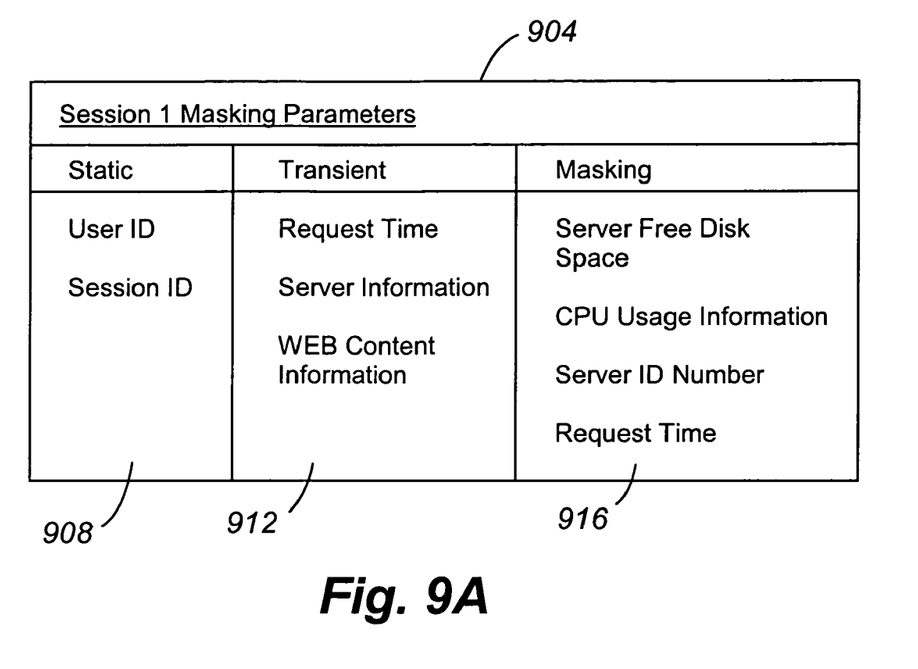
FIG. 9A depicts a first logical container of URL masking parameters in accordance with at least some embodiments of the present invention.
Figure 9B:
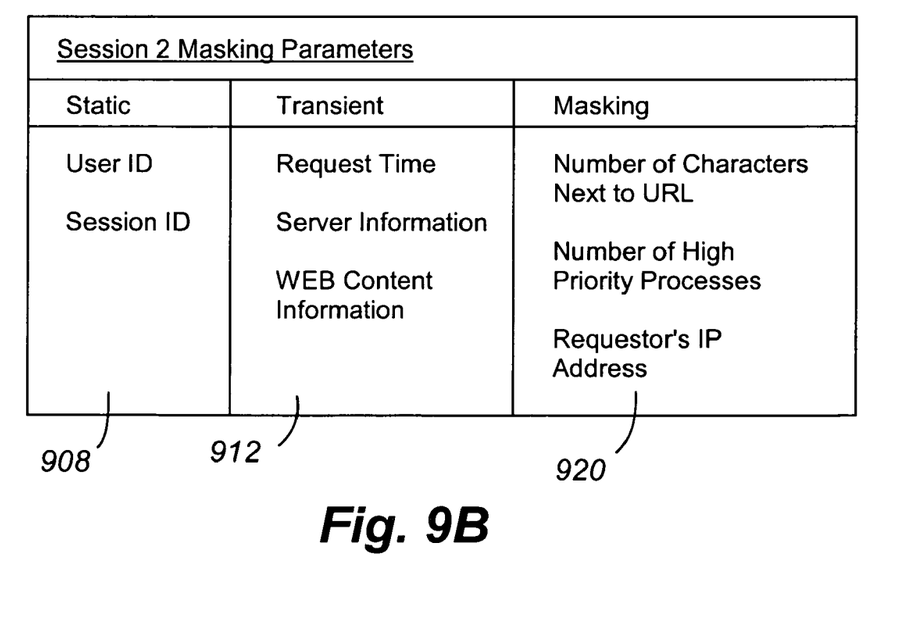
FIG. 9B depicts a second logical container of URL masking parameters in accordance with at least some embodiments of the present invention.

Referring now to FIGS. 9A and 9B a list of masking parameters will be described in accordance with at least some embodiments of the present invention. The first session masking parameter container 904 comprises a static parameters field 908, a transient parameters field 912, and a masking parameters field 916. The parameters that are typically in the static parameters field 908 are user identifier and session identifier. The user identifier is generally unique to a particular user and the session identifier is unique to the current session. In the event that the session changes due to the occurrence of an event or the like, the session identifier may be updated.

The parameters in the transient parameters field 912 typically include parameters that vary over time, or at least may vary depending upon network conditions. Examples of parameters that can be found in the transient parameters field 912 include time-based parameters (e.g., time that a client requested a particular Web content, time that content was provided to the client, and/or any time associated with a particular action or event), system/server transient information (e.g., server identification number, number of processes currently being employed, free disk space in the server, file being accessed by the server, number of high priority processes, number of files open on a system connected to the server, CPU's usage information, etc.), or Web content information (e.g., number of characters in a word that immediately precedes the URL, number of characters in a word that immediately succeeds the URL, number of words/characters in a given line of the Web content, etc.).

When a request for Web content containing a URL is received at the URL manager 316, the URL manager may use a sub-set of the static and/or transient parameters to determine what masking parameters should be used to mask a given URL. For example, at the time of a first request during a first session, the request time may correspond to the second half of a minute and based on that determination, the URL manager 316 may decide to use four masking parameters, for example, server free disk space, CPU usage information, server ID number, and request time populate the masking field 916. Each of the values for these parameters may be inputs to the masking algorithm employed by the URL manager 316 such that the URL is masked in a substantially unique way for the given session. On the other hand, if the request during the first session was received some time during the first half of the minute, the URL manager 316 may decide only to use three masking parameters, and those parameters may not necessarily coincide with the parameters that were chosen based on the request being received during the second half of the minute.

Of course, the next time a request is received the same rules for selecting masking parameters may not be followed by the URL manager 316. For example, the URL manager 316 may not even use the request time to determine what masking parameters should be used. Rather, the URL manager may simply use the free disk space to determine how many and what masking parameters should be used to mask the URL. Based on the free disk space, the masking parameters in the masking field 920 selected during a second session may include the number of characters in a word next to the URL, the number of high priority processes being processed by the server, and the requestor's IP address. As can be appreciated, some of the masking parameters used during the first session may also be used during the second session. In the event that some of the reused parameters are transient, the values of those parameters may not necessarily be the same in the first session as they are in the second session.

In an alternative configuration, a queue of masking parameters may be employed. The queue of masking parameters may include those potential masking parameters discussed above, whether transient or static. Also, the static and/or transient parameters may be used to select a number of masking parameters from the masking parameter queue. For example, there may be twelve masking parameters in the masking parameter queue. When a request for Web content containing a URL is received, the URL manager 316 may use one or more of the static and/or transient parameters to determine how many masking parameters should be chosen from the masking parameters queue to mask the URL. The URL manager 316 may decide that two masking parameters will be used because the word next to the URL has two characters or the number of characters in the word next to the URL is divisible by two. Based on this, the URL manager 316 only needs to select the first two masking parameters from the queue. In the event that the number of characters in the word next to the URL was divisible only by three, the URL manager 316 may have decided to choose three masking parameters instead of two. Once the URL manager 316 has decided what masking parameters will be used to mask the URL, it only needs to determine the values of the masking parameters for the input to the masking algorithm. An advantage to implementing a masking parameter queue is that the type of masking parameters may be predetermined but kept secure by the URL manager 316. This provides for a relatively easy way for the URL manager 316 to keep track of what parameters and values were used to mask a given URL, thus making it easier for the URL manager 316 to unmask the URL. Furthermore, the URL manager 316 does not have to continually reference a table containing a list of tokens to real URLs, rather the URL manager 316 only needs to maintain the queue of potential masking parameters and used masking parameters so that masked URLs can be properly unmasked and the Web content related to the URL can be retrieved.

Figure 10:
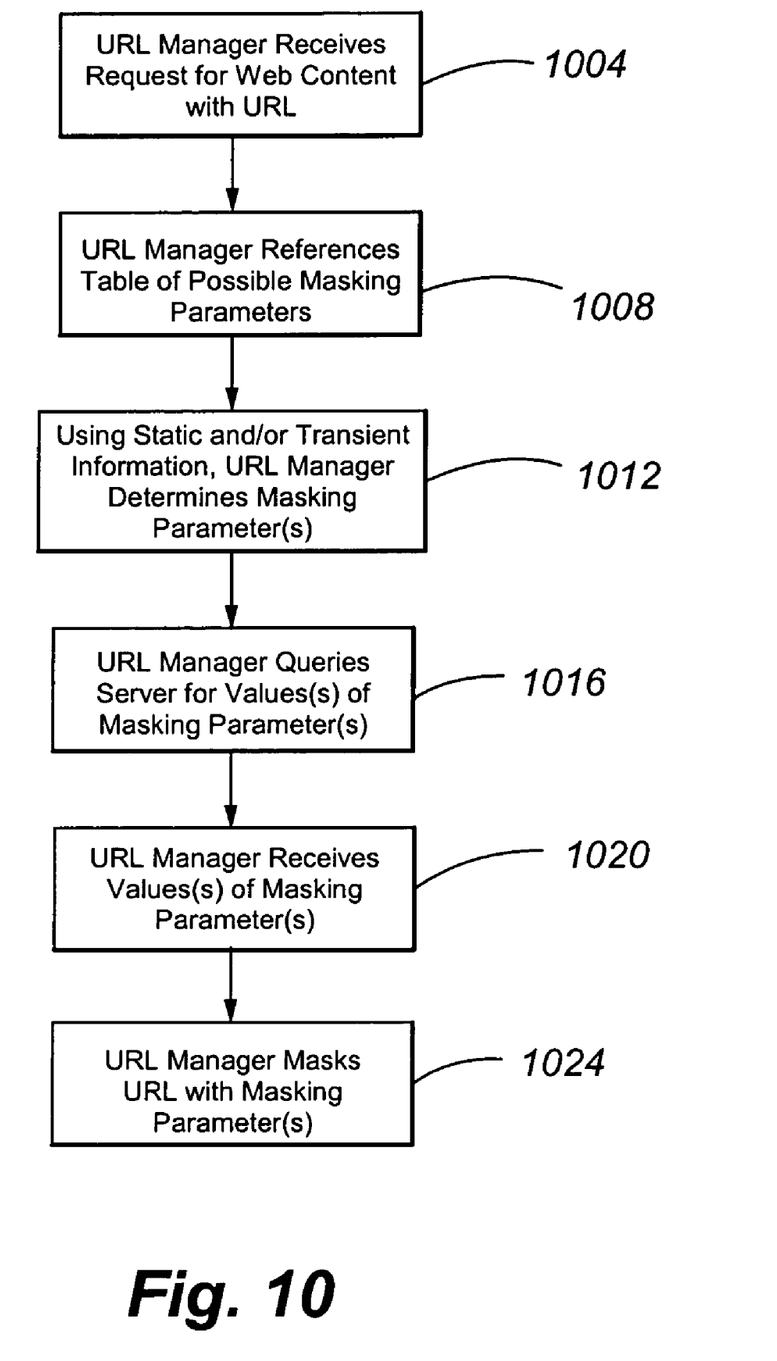
FIG. 10 is a flow chart depicting a method of determining URL masking parameters in accordance with at least some embodiments of the present invention.

Referring now to FIG. 10 a method of selecting masking parameters will be described in accordance with at least some embodiments of the present invention. Initially the URL manager 316 receives a request for Web content with a URL (step 1004). Thereafter, the URL manager 316 references a table of possible masking parameters (step 1008). As noted above, the table of possible masking parameters may include a masking parameters queue or may simply be based on a predetermined masking parameters selection algorithm using static and/or transient session information. Using the static and/or transient session information, the URL manager 316 determines the masking parameters that will be used to mask the given URL, typically from a masking parameters queue or a masking parameters selection algorithm (step 1012).

Once the masking parameters have been selected, the URL manager 316 either determines directly the values for the masking parameters or queries the server 308 for values of the masking parameters (step 1016). The URL manager 316 may not necessarily need to query the server for static parameters like user identifier and session identifier, or other transient parameters like time-based parameters or Web content based parameters. However, the URL manager 316 may need to query the server 308 for server based transient masking information. The URL manager 316 then receives the requested values for the masking parameters from the server (step 1020). Thereafter, the URL manager 316 uses the values of the selected masking parameters to mask the given URL prior to its transmission to the endpoint 312 (step 1024). As can be appreciated, the number of parameters used to mask a given URL may be any number greater than one. Furthermore, static parameters are generally used, typically in conjunction with other selected transient masking parameters, to mask a given URL. Specifically, the user identifier and/or session identifier are used for masking a URL to ensure a certain level of security surrounding the masked URL, and to help deter any unauthorized access to Web content associated with the masked URL.

The present invention, in various embodiments, includes components, methods, processes, systems and/or apparatus substantially as depicted and described herein, including various embodiments, sub-combinations, and subsets thereof.

Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

Moreover, the disclosed methods may be readily implemented in software that can be stored on a non-transitory computer-readable medium, and executed on programmed general-purpose computer with the cooperation of a controller and memory, a special purpose computer, a microprocessor, or the like.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   intercepting web content to be displayed in a web page by a browser client;
   analyzing, by a processor, the web content for one or more references within the web content, the references being one or more Uniform Resource Locators (URLs);
   during a first session, selecting a first set of masking parameters from a masking parameter queue based on one or more static or transient parameters;
   editing the web content by masking a reference with the selected first set of masking parameters, the masked reference to be displayed in the web page by the browser client;
   during a second session, selecting a second set of masking parameters from the masking parameter queue based on one or more of the static or transient parameters, wherein the first and second sets of masking parameters include at least one different type of parameter; and
   editing the web content by masking a second reference with the selected second set of masking parameters, the second masked reference to be displayed in a second web page by the browser client, wherein within each respective session, each occurrence of a same URL with the web content is masked in a different manner than other versions of the same URL in the web content.

2. The method of claim 1, wherein the first and second sets of parameters comprise at least one of a time-stamp, a server identification number, a number of processes currently being employed by a server, free disk space in a server, a file being accessed by a server, a number of high priority processes, a number of files open on a system connected to a server, a CPU's usage information, a user name, and subject matter surrounding at least one of the references in the Web content.

3. The method of claim 1, further comprising:
   receiving Web content comprising the reference in at least one of the first and second sessions;
   replacing the received reference with the masked reference in the Web content, thus resulting in an altered Web content comprising the masked reference; and
   distributing the altered Web content comprising the masked reference to at least one client.

4. The method of claim 1, wherein the first session corresponds to a first connection between the at least one client and a server, wherein the second session corresponds to the same first connection between the at least one client and server, and wherein the second session is initiated when the at least one client initiates an action that requests new Web content from the server.

5. The method of claim 1, wherein the first session corresponds to a first communication between the at least one client and a server, and wherein the second session corresponds to a second communication between the at least one client and server that occurs at a time later than the first communication.

6. The method of claim 1, wherein the first session ends when Web content comprising a reference in a second session is masked, further comprising purging the first set of parameters from memory.

7. The method of claim 1, wherein the masking comprises:
   determining an amount of time in which at least one of the masked references should become inactive after it has been distributed to the at least one client;
   enabling at least one of the masked references with a timing-out mechanism;
   determining whether the amount of time has lapsed; and
   in the event that the amount of time has lapsed, altering at least one of the masked references such that it cannot be properly unmasked by a server.

8. The method of claim 1, wherein the masking comprises:
   determining authorized and unauthorized actions that can be performed by the at least one client during the first session;
   enabling at least one of the masked references with an action sensitive mechanism;
   a server monitoring actions of the at least one client during the first session;
   in the event that an authorized action is performed by the at least one client, altering at least one of the masked references such that it can be properly unmasked by the server; and
   in the event that an unauthorized action is performed by the at least one client, altering at least one of the masked references such that it cannot be properly unmasked by the server.

9. The method of claim 1, further comprising:
   receiving at least one of the masked references from a first client;
   parsing at least one of the masked references to determine a session identification number;

validating the session identification number in order to confirm the session identification number corresponds to a legitimate session identification number;

after the session identification number has been validated, determining a set of parameters that were used to mask at least one of the masked references; and unmasking at least one of the masked references using the determined set of parameters.

10. The method of claim 1, wherein at least one of the first and second sets of parameters are chosen based at least in part on time-stamped information.

11. The method of claim 1, wherein at least one of the first and second sets of parameters are chosen based at least in part on transient information.

12. A non-transitory computer readable medium comprising instructions, that when executed by a processor, are operable to perform the method of claim 1.

13. An information server, comprising:

an input operable to receive a request from a client for Web content to be displayed in a web page by a browser client, the Web content comprising at least one reference to further Web content;

a URL manager that intercepts the web content to be displayed in the web page by the browser client and analyzes the web content for one or more references within the web content, the references being one or more Uniform Resource Locators (URLs);

a reference manager and processor operable to select a first set of parameters from a masking parameter queue based on one or more static or transient parameters for masking the at least one reference in the web page in a first session and a second set of parameters from the masking parameter queue based on one or more of the static or transient parameters, that includes at least one parameter that differs from the first set of parameters, for masking the at least one reference in a web page in a second session, wherein the reference manager is further operable to replace the at least one reference in the web page with a masked version of the at least one reference, thus resulting in an altered Web content comprising the masked version of the at least one reference; and an output operable to distribute the altered Web content including the masked version of the at least one reference to the client for display by the browser client, wherein within each respective session, each occurrence of a same URL with the web content is masked in a different manner than other versions of the same URL in the web content.

14. The information server of claim 13, wherein the first and second set of parameters comprise at least one of a timestamp, the server identification number, a number of processes currently being employed by the server, free disk space in the server, a file being accessed by the server, a number of high priority processes, a number of files open on a system connected to the server, a CPU's usage information, a user name, and subject matter surrounding the at least one reference in the Web content.

15. The information server of claim 13, wherein the first session corresponds to a first connection between the client and the server, wherein the second session corresponds to the same first connection between the client and server, and wherein the second session is initiated when the client initiates an action that requests new Web content from the server.

16. The information server of claim 13, wherein the first session corresponds to a first communication between the client and the server, and wherein the second session corresponds to a second communication between the client and server that occurs at a time later than the first communication.

17. The information server of claim 13, wherein the first session ends when the Web content comprising the at least one reference in a second Web session is received, and wherein the reference manager is further operable to purge the first set of parameters from memory.

18. The information server of claim 13, wherein the reference manager is further operable to determine an amount of time in which the at least one reference should become inactive after it has been distributed to the client, enable the masked version of the at least one reference with a timing-out mechanism, determine whether the amount of time has lapsed, and in the event that the amount of time has lapsed, to alter the masked version of the at least one reference such that it cannot be properly unmasked by the server.

19. The information server of claim 13, wherein the reference manager is further operable to determine authorized and unauthorized actions that can be performed by the client during the first session, enable the masked version of the at least one reference with an action sensitive mechanism, monitor actions of the client during the first session, and in the event that an authorized action is performed by the client, to alter the masked version of the at least one reference such that it can be properly unmasked by the server.

20. The information server of claim 13, wherein the reference manager is further operable to receive a masked reference to Web content from a first client, parse the masked reference to Web content to determine a session identification number, validate the session identification number in order to confirm the session identification number corresponds to a legitimate session identification number, after the session identification number has been validated, determine a set of parameters that were used to mask the masked reference to Web content, and to unmask the masked reference to Web content using the determined set of parameters.

21. The information server of claim 13, wherein at least one of the first and second sets of parameters are chosen based at least in part on time-stamped information.

22. The information server of claim 13, wherein at least one of the first and second sets of parameters are chosen based at least in part on transient information.

* * * * *